Jan. 10, 1967 F. A. WYCZALEK 3,296,874
VIBRATION GENERATOR
Filed Dec. 16, 1964 3 Sheets-Sheet 1

INVENTOR.
Floyd A. Wyczalek
BY
W. F. Wagner
ATTORNEY

Jan. 10, 1967         F. A. WYCZALEK         3,296,874
                       VIBRATION GENERATOR

Filed Dec. 16, 1964                         3 Sheets-Sheet 3

INVENTOR.
Floyd A. Wyczalek
BY
W. F. Wagner
ATTORNEY

United States Patent Office 3,296,874
Patented Jan. 10, 1967

3,296,874
VIBRATION GENERATOR
Floyd A. Wyczalek, Birmingham, Mich., assignor to General Motors Corporation, Detroit, Mich., a corporation of Delaware
Filed Dec. 16, 1964, Ser. No. 418,780
20 Claims. (Cl. 74—87)

This invention concerns a vibrator and more particularly a vibration generator having an eccentric unbalanced mass which is drivingly rotated about a chamber under the influence of pressurized fluid.

As is well-known, air-driven eccentric mass vibrators are inherently inefficient and although a number of vibrator designs have been proposed in the past in an effort to alleviate this deficiency, none have proven to be completely acceptable, one reason probably being that invariably the vibrator design calls for some form of valve member to move under the control of the rotating mass for purposes of opening and closing ports that emit and exhaust air from the vibrator.

Accordingly, the principal object of this invention is to provide a vibration generator which has a rotor and rotor chamber so shaped that the two cooperate with each other without requiring any auxiliary valving for delivering compressed air to and exhausting air from a plurality of variable volume chambers for driving the rotor about the chamber.

The above object and others are accomplished in accordance with the invention by a vibration generator comprising a housing having a cavity with an inner surface formed therein. In one form of the invention, a shaft is fixed to the housing and centrally disposed in the cavity for supporting a rotor having an outer surface adapted to orbit about an axis offset and parallel to the axis of the cavity. One of the surfaces of the rotor or the cavity is shaped as a trochoid with the other being generally of an enveloping shape. The rotor has a plurality of apex portions formed on the periphery thereof which are equally spaced about the axis of the rotor and continuously located proximate the inner surface on the cavity so that during the rotation of the rotor a plurality of variable volume working chambers are formed. A source of pressurized air is utilized for driving the rotor and is directed to the latter through passage means formed in the housing. In the preferred form of the invention, a plurality of ports are formed in the rotor for sequentially establishing communication between the source of pressurized air and the working chambers. In addition, the housing includes exhaust passages which connect the cavity to atmosphere so that spent air can be emitted from the vibrator.

A more complete understanding of the invention can be derived from the following detailed description and taken in conjunction with the drawings in which.

Figure 4:
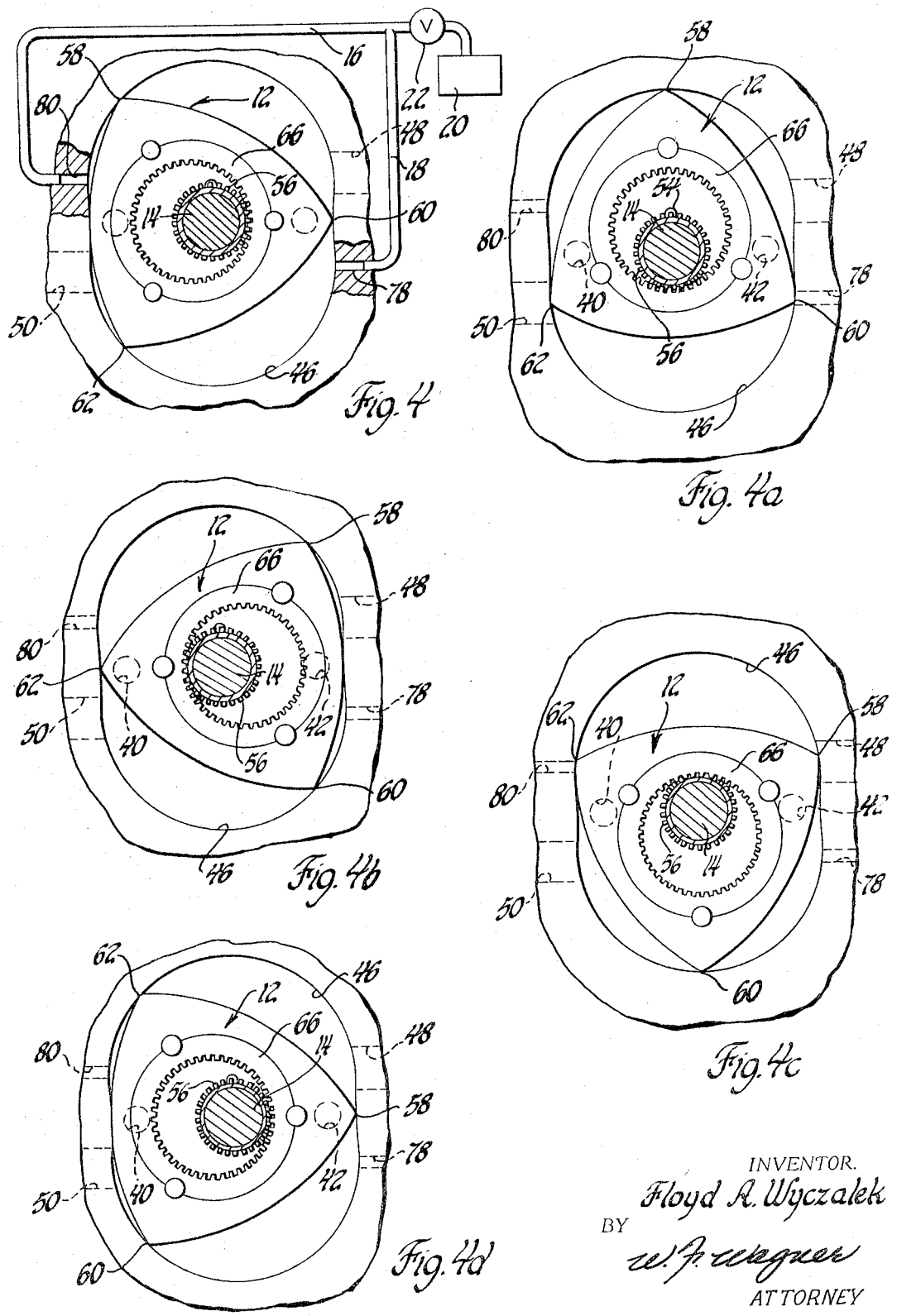
FIGURE 4 shows a modified form of the vibration generator as shown in FIGURES 1 through 3.
Figure 5:
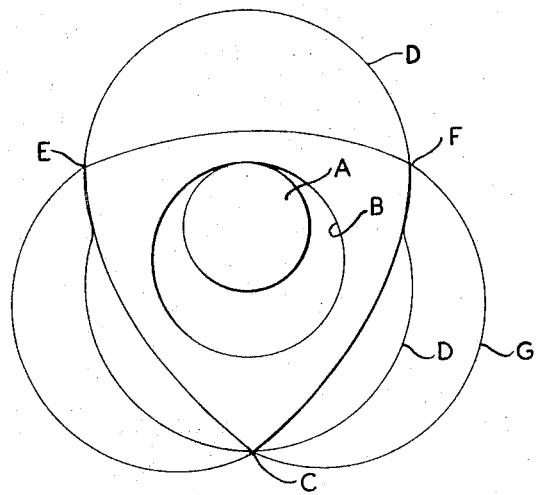
Figure 6:
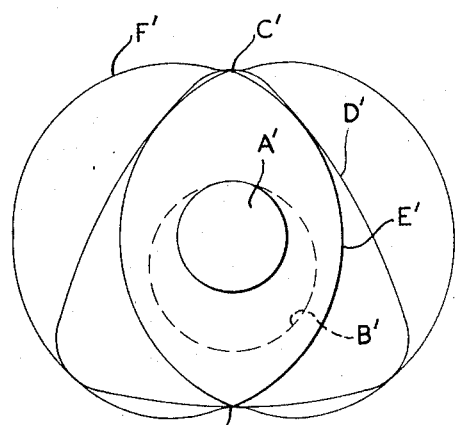
Figure 7:
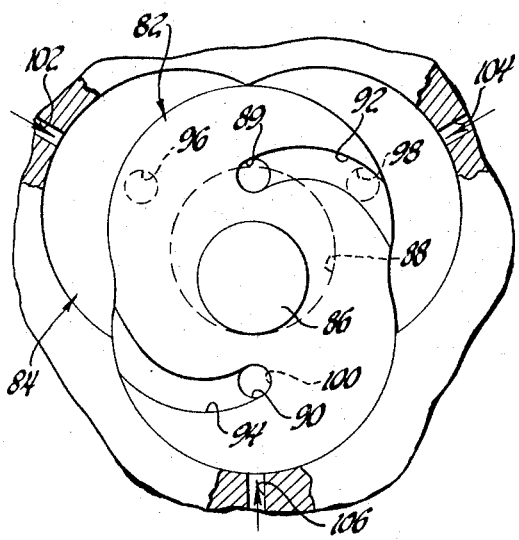
Figure 8:
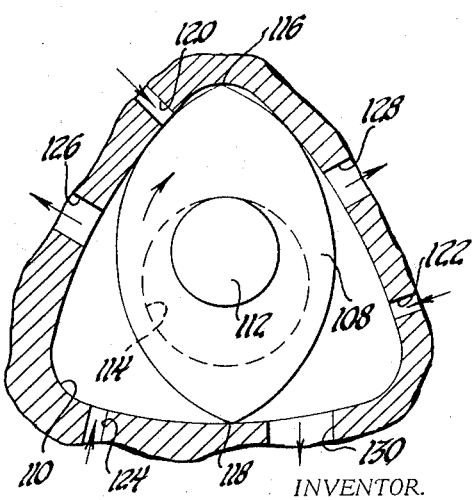

FIGURES 4a, 4b, 4c, and 4d show the vibrator of FIGURE 4 with the rotor thereof in varying positions as it is driven around the working chambers;

FIGURE 5 is a geometrical diagram showing the development of the curves used for the rotor and working chamber of the vibration generator of FIGURES 1 through 4;

FIGURE 6 is a geometrical diagram showing the development of the curves for another form of rotor and working chamber;

FIGURE 7 shows a modified vibration generator having having a rotor and working chamber formed with the curves shown in FIGURE 5; and FIGURE 8 shows another form of vibration generator having a rotor and working chamber formed with the curves shown in FIGURE 6.

Figure 1:
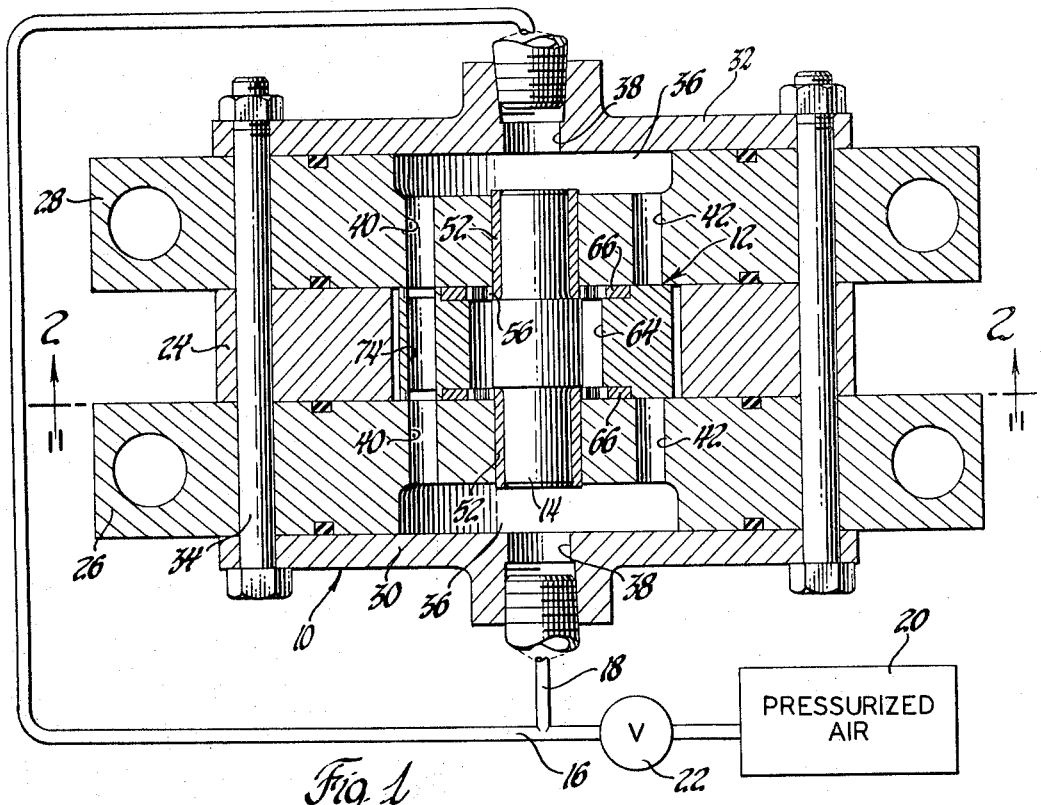
FIGURE 1 is an elevation view with parts broken away of a vibrator made in accordance with the invention.
Figure 2:
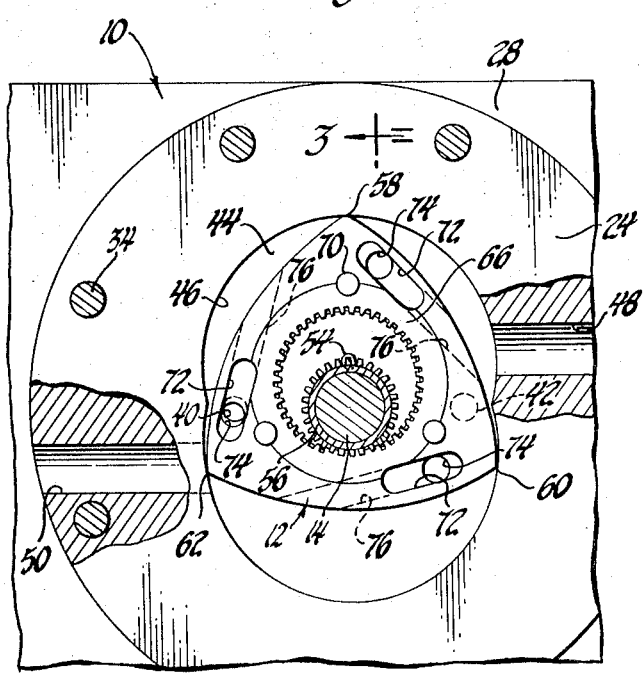
FIGURE 2 is a view taken on lines 2—2 of FIGURE 1.
Figure 3:
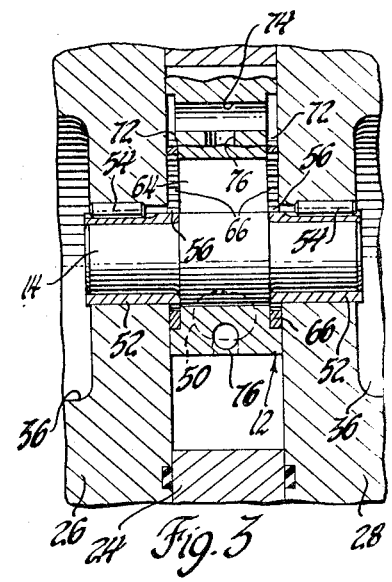
FIGURE 3 is a fragmentary view taken on lines 3—3 of FIGURE 2.

Referring now to the drawings and specifically FIGURES 1 through 3, one form of a vibration generator made in accordance with the invention is shown comprising a housing 10 that includes an eccentrically supported rotor 12 adapted to be driven about a shaft 14 by compressed air directed to the housing via the lines 16 and 18 from a source 20 of pressurized air. A valve 22 is interposed in the line 16 between the housing 10 and source of compressed air for purposes of controlling the amount of air supplied to the vibrator in a manner well known to those skilled in the art.

More specifically, the housing 10 comprises a center plate 24, a pair of identical side plates 26, 28 and a pair of identical end caps 30, 32, all of which are interconnected by a plurality of circumferentially spaced bolts, one of which is indicated by the numeral 34. As best seen in FIGURE 2, each side plate includes a manifold chamber 36 which is sealed by one of the end caps and connects with the source 20 through a port 38. A pair of air inlet ports 40 and 42 communicate with the chamber 36 and are formed in each of the side plates at points equally spaced from the shaft 14. The similarly numbered ports in the plates 26 and 28 are axially aligned and are adapted to feed compressed air from the chambers 36 to a cavity or working chamber 44 formed in the center plate 24 and defined by an inner wall 46 that takes the form of an epitrochoidal curve having two lobe portions. Exhaust ports 48 and 50 are formed in the plate 24 and connect the respective lobe portions of the cavity to atmosphere. It will be noted that except for the exhaust ports, the cavity 44 is completely sealed from atmosphere.

As seen in FIGURES 2 and 3, the rotor 12 is supported in the cavity 44 by the wall 46 and the shaft 14, each end of which carries a sleeve 52 that is restrained from rotary movement relative to the housing by a pin 54. The inner end of each sleeve is formed as a gear 56 having external gear teeth that project radially into the cavity 44 immediately adjacent the inner wall of the associated side plate. As seen in FIGURE 2, the shaft 14 is centrally located within the cavity 44 with the center thereof lying in a horizontal plane passing through the centers of the inlet ports 40 and 42 formed in the side plates.

The rotor 12 has a generally triangular configuration having apex portions 58, 60, and 62, each of which is equally spaced from the center axis of the rotor. A transverse cylindrical opening 64 is centrally formed in the body of the rotor and is counterbored at the opposite ends for accommodating side ring gears 66 having internal gear teeth, a portion of which are adapted to mesh with the gear teeth formed on the stationary gears 56 as the rotor is driven about the shaft. Each ring gear 66 is fixed to the rotor by three pins, one of which is indicated by the numeral 70 and one important function of the meshing gears 56 and 66 is to maintain the proper phase relationship between the rotor and cavity so that the apex portions follow the epitrochoidal curvature of the wall 46.

Another function of the gears 56 and 66 is to properly time the opening and closing of the inlet and exhaust ports. In this connection, it will be noted that, as seen in FIGURE 1, the transverse length of the rotor is substantially equal to the width of the cavity 44 so that the ports 40 and 42 can be closed by the rotor body. In addition, it will be noted that adjacent each apex portion an oblong well 72 is formed in both side walls of the rotor and connects with a transverse passage 74 which in turn communicates with an orifice 76 that opens at the periphery of the rotor, as illustrated in FIGURES 1 and 3. As should be apparent, each well 72 is adapted to register with the inlet ports so as to deliver compressed air via the orifice 76 to one of the variable volume chambers created by the rotor as it orbits about the cavity 44. In this case, the rotor is designed with three wells, each of which is located so that as the rotor 12 moves about the shaft 14, one of the wells is moved into a registering position with one of the inlet ports so that compressed air can be delivered to an expandable chamber. This will be more fully understood from the description of the operation of this vibration generator which follows now.

In operation and as seen in FIGURE 2, the passage 74 adjacent apex portion 62 is in line with the air inlet ports 40 so that compressed air is directed via passage 74 and orifice 76 to a variable volume crescent-shaped chamber located between apex portions 58 and 62 and defined by the peripheral outer surface of the rotor and a portion of the inner wall 46. As the pressure increases in this chamber, the upper portion of the rotor 12 is forced to move to the right or in a clockwise direction about the shaft 14 so that the ring gears 66 walk around the gears 56. During such time, the chamber located between apex portions 58 and 60 is connected to the exhaust port 48. Similarly, the chamber located between apex portions 60 and 62 is vented to atmosphere by exhaust port 50.

It will also be noted that in the position of FIGURE 2 the rotor body blocks air inlet ports 42 so that compressed air is admitted to the cavity only through ports 40. Thus, it should be apparent that as the rotor 12 continues to orbit about the shaft 14 in a clockwise direction, the port 74 next to apex portion 62 moves out of axial alignment with the ports 40; however, a complete loss of communication therebetween does not occur until the wells 72 move past the ports 40. It is important to note that the length of each well 72 fore and aft of the passage 74 is a matter of design and should be such that sufficient air is admitted to the expanding chamber so that ample energy is available to drive the rotor to a position where the wells adjacent apex portion 58 establish communication with the ports 42. When this occurs, the chamber existing between apex portions 58, 60, the rotor, and the cavity wall 46, then serves as the expanding chamber to continue the drive of the rotor about the shaft. As should be apparent, passage 74 adjacent apex portion 60 similarly establishes communication with ports 40 and 42 as the rotor orbits in the cavity 44 so that the rotor is continually driven about the shaft so long as the chambers 36 are connected with the source of compressed air.

FIGURES 4 through 4d show the positions assumed by the rotor 12 of FIGURE 2 as it moves through one-third of a cycle. In all these positions, it will be noted that the apex portions 58, 60, and 62 are continuously located proximate the inner wall of the cavity so that the chambers defined by the outer surface of the rotor and the inner surface of the cavity will be substantially sealed from each other at all times. Moreover, it will be noted that the vibration generator shown in these figures is a simplified version of that disclosed in FIGURES 1 through 3. In this connection, the porting in the rotor 12 is eliminated and instead air inlet passages 78 and 80 are provided in the housing below and above the exhaust passages 48 and 50, respectively.

As mentioned above, as the rotor orbits about the shaft, each of the apex portions are continuously located proximate the inner wall of the cavity so as to form variable volume chambers. This particular relationship is realized by proper designing of the cavity and the rotor. In this instance, the pitch diameter of the gear 56 and the pitch diameter of the ring gear 66 have radii proportioned as 2:3. Thus, as seen in FIGURE 5, assuming circle A and circle B represent the gear 56 and the ring 66, respectively, and further assuming circle B rolls on the outside of circle A without slipping as provided by the meshing gears, then a fixed point such as point C which is a prolonged radius of circle B will generate the curve D or the profile of the cavity 44 of the vibration generator of FIGURE 2. As illustrated in FIGURE 5, this curve D varies from a maximum along a vertical axis to a minimum along a horizontal axis and is known as an epitrochoid.

In order to obtain the outer shape of the rotor 12, the epitrochoid D is fixed with circle A and the latter is rotated without slipping on the inside of circle B. By so doing, points E and F are located and the outer curvature of the rotor is generated as an inner enveloping curve. During the generation of the inner enveloping curve or rotor shape, the rotation of the epitrochoid D serves to generate a curve G or an outer enveloping curve which is formed with three lobes, one of which includes one lobe of the curve D.

It is possible to arrive at other forms of vibrators in which the rotor and the rotor chamber have a configuration which eliminates the need for auxiliary valve members. For example, as seen in FIGURE 6, circles A' and B' are identical to circles A and B of FIGURE 5 insofar as having the respective radii thereof proportioned 2:3, and the curves illustrated are obtained as follows: First, the radii of circle A is extended to point C' and is fixed to rotate with circle A'. Circle A' is then rotated inside of circle B' so as to generate the hypothrochoid curve D'. Subsequently, the curve D' is connected to the circle B' and the latter is rotated without slipping on the outside of circle A'. This movement of hypotrochoid D' will result in the generation of an inner enveloping curve E' and an outer two-lobed enveloping curve F' which is similar to the epitrochoid D of FIGURE 5. It will be noted that in this case the inner enveloping curve E' is formed with two apex portions C' and G'.

FIGURES 7 and 8 illustrate different forms of vibration generators which incorporate rotor and working chamber designs made up of curves of the type shown in FIGURES 5 and 6. For example, FIGURE 7 shows a vibration generator in which the rotor 82 and the working chamber or cavity 84 take the form of the epotrochoidal curve D and the three-lobed outer enveloping curve G, respectively, as seen in FIGURE 5. This arrangement differs from that shown in FIGURES 1 through 3 in that the shaft 86 is fixed to the rotor 82 and orbits within an opening 88 formed in the housing of the vibration generator. In addition, the rotor is formed with transverse passages 89 and 90 which respectively connect with arcuate-shaped wells 92 and 94 that are formed on the opposite sides of the rotor and open at the periphery of the rotor on opposite sides thereof. As seen in FIGURE 7, the centers of the passages 89 and 90 are located along the vertical center axis of the shaft 86 and are adapted to communicate with air exhaust ports 96, 98 and 100 that are formed in the housing and circumferentially spaced about the opening 88 an angular distance of approximately 120°. Moreover, it will be understood that the passages 89 and 90 are equally spaced from the center of shaft 86, a distance which permits the passages to register with the ports 96, 98, and 100 as the rotor orbits about the cavity. One example of this can be seen in FIGURE 7 where passage 90 is directly in line with port 100. Also, it will be noted that the wells 92 and 94 are located in arcuate paths which permit them to overlap with the exhaust ports as the rotor is driven. In other words, as the rotor is driven about the cavity, wells 92 and 94 will each register with each of the exhaust ports the same as the well 92 is shown to be registering with port 98 in FIGURE 7.

Compressed air is directed into the cavity 84 through air inlet ports 102, 104, and 106, each of which is formed in the housing along an axis that originates at the center of the opening 88 and passes through the center of the exhaust port in the associated lobe. Thus, it should be apparent that during operation air is continually flowing into the cavity via the air ports except when blocked by the rotor.

The vibration generator of FIGURE 7 is similar in operation to the generator of FIGURES 1 through 3. For example, with the rotor in the position of FIGURE 7, the lobe portions associated with ports 102 and 104 are connected to atmosphere via wells 92 and 94. However, due to the fact that well 94 is partially blocked by the inner wall of the cavity while the well 92 is fully open, a pressure differential acts on the rotor 82 causing it to move clockwise about its axis. This movement results in the opening of air port 106 so that the lobe portion associated therewith is expanded under pressure to continue the clockwise movement of the rotor. The lobe portion adjacent port 106 expands under pressure until the rotor moves to a position where well 92 begins to establish communication with port 106. This occurs just prior to the time when passage 89 is fully registered with port 98. When the rotor reaches this position, the well 94 is in the same position with respect to port 96 as well 92 is with respect to port 98 in the view of FIGURE 7. Thus, again a pressure differential acts on the rotor in the manner described above to continue the orbital movement of the rotor so that port 104 is opened and the associated lobe portion expanded. This movement continues with the rotor body of course acting as the valving member for opening and closing the air inlet ports and the exhaust ports and it will be understood that suitable gears having a ratio 2:3 such as those described in connection with the vibration generator of FIGURES 1 through 3 are also provided in this case for proper timing.

FIGURE 8 illustrates another form of vibration generator which in this case has the rotor and the working chamber designed with the curves shown in FIGURE 6. In other words, the rotor 108 takes the shape of the inner enveloping curve E′ while the cavity 110 has the configuration of the hypotrochoid D′. As in the case of the embodiment of FIGURE 7, the rotor 108 is rigid with a shaft 112 which orbits within an opening 114 formed with the housing of the generator, and the shaft and opening are proportioned 2:3. Moreover, it will be understood that gears interconnect the shaft and opening in a manner as aforedescribed in connection with the vibration generators shown in FIGURES 2 and 7.

The rotor 108 includes apex portions 116 and 118 which are equally spaced from the shaft center and located at diametrically opposed points. The apex portions maintain a sealing engagement with the inner wall of the cavity 110 as the rotor orbits about the chamber under the driving influence of compressed air which enters the cavity via inlet ports 120, 122, and 124. As the rotor moves about the cavity, variable volume chambers are formed which are vented at the proper time through exhaust ports 126, 128, and 130.

The vibration generator of FIGURE 8 has the inlet and exhaust ports formed in the housing with one of each being located along each wall of the triangularly-shaped cavity. For proper operation, the exhaust ports are located approximately midway along the length of each wall while the inlet ports are placed approximately halfway between the exhaust port and one end of the wall as seen in FIGURE 8.

It should be apparent that another form of vibration generator can be designed utilizing the curves developed in FIGURE 6. For example, the hypotrochoidal curve D′ could be the shape of the rotor while the outer enveloping curve F′ can be used for the shape of the working chamber. If this is done, a vibrator design similar to that of FIGURES 1 through 3 will be realized. Accordingly, the air inlet and exhaust porting can be similarly located.

In all of the devices described above, maximum efficiency of operation can be realized by employing seals with the rotor or the working chamber. For example, placing sealing members in the apex portions of the rotors 12 and 108 of FIGURES 2 and 8, respectively, will prevent air from leaking between chambers as each rotor orbits about its chamber. In the case of the vibration generator of FIGURE 7, the seals would be positioned at the points of intersection between the lobe portions.

Various changes and modifications can be made in this construction without departing from the spirit of the invention. Such changes and modifications are contemplated by the inventor and he does not wish to be limited except by the scope of the appended claims.

What is claimed is:

1. A vibration generator comprising a housing having a cavity with an inner surface formed therein, a rotor having an outer surface, said rotor supported in said cavity for rotation therein with the axis of the rotor offset and parallel to the axis of the cavity, one of said surfaces being shaped as a trochoid with the other of said surfaces being generally of an enveloping shape, a plurality of apex portions formed on the periphery of the rotor and being equally spaced about the axis of the rotor, each of said apex portions continuously located proximate said inner surface during the rotation of said rotor so as to form a plurality of variable volume working chambers, a source of pressurized fluid, and means formed in said housing for establishing communication between said source and said working chambers whereby said rotor is drivingly rotated about said cavity.

2. A vibration generator comprising a housing having a cavity with an inner surface formed therein, a rotor having an outer surface, gear means supporting said rotor in said cavity for rotation therein with the axis of the rotor offset and parallel to the axis of the cavity, one of said surfaces being shaped as a trochoid with the other of said surfaces being generally of an enveloping shape, a plurality of apex portions formed on the periphery of the rotor and being equally spaced about the axis of the rotor, each of said apex portions continuously located proximate said inner surface during the rotation of said rotor so as to form a plurality of variable volume working chambers, a source of pressurized fluid, passage means formed in said housing for connecting said source with said cavity, and a plurality of ports formed in the rotor for sequentially establishing communication between said passage means and said working chambers whereby said rotor is drivingly rotated about said cavity.

3. A vibration generator comprising a housing having a cavity with an inner surface formed therein, a rotor supported in said cavity for rotation therein with the axis of the rotor offset and parallel to the axis of the cavity, a plurality of apex portions formed on the periphery of the rotor and being equally spaced about the axis of the rotor, each of said apex portions continuously located proximate said inner surface during the rotation of said rotor so as to form a plurality of variable volume working chambers, a source of pressurized fluid, passage means formed in said housing for connecting said source with said cavity, and a plurality of ports formed in the rotor for sequentially establishing communication between said passage means and said working chambers whereby said rotor is drivingly rotated about said cavity.

4. A vibration generator comprising a housing having a cavity with an inner surface formed therein, a rotor having an outer surface, said rotor supported in said cavity for rotation therein with the axis of the rotor offset and parallel to the axis of the cavity, one of said surfaces being shaped as a trochoid with the other of said surfaces being generally of an enveloping shape, a plurality of apex portions formed on the periphery of the rotor and being equally spaced about the axis of the rotor, each of said apex portions continuously located proximate said inner surface during the rotation of said rotor so as to form a plurality of variable volume working chambers, a source of pressurized fluid, passage means formed in said housing for connecting said source with said cavity, and a plurality of ports formed in the rotor for sequentially establishing communication between said passage means and said working chambers whereby said rotor is drivingly rotated about said cavity.

5. A vibration generator comprising a housing having a cavity with an inner surface formed therein, a rotor having an outer surface, said rotor supported in said cavity for rotation therein with the axis of the rotor offset and parallel to the axis of the cavity, said inner surface being shaped as a multi-lobed epitrochoid, a plurality of apex portions formed on the outer surface of the rotor and being equally spaced about the axis of the rotor, each of said apex portions continuously located proximate said inner surface during the rotation of said rotor so as to form a plurality of variable volume working chambers, a source of pressurized fluid, passage means formed in said housing for connecting said source with said cavity, and a plurality of ports formed in the rotor for sequentially establishing communication between said passage means and said working chambers whereby said rotor is drivingly rotated about said cavity.

6. A vibration generator comprising a housing having a cavity with an inner surface formed therein, a rotor having an outer surface, said rotor supported in said cavity for rotation therein with the axis of the rotor offset and parallel to the axis of the cavity, said inner surface being shaped as a bi-lobed epitrochoid, three apex portions formed on the periphery of the rotor and being equally spaced about the axis of the rotor, each of said apex portions continuously located proximate said inner surface during the rotation of said rotor so as to form a plurality of variable volume working chambers, a source of pressurized fluid, passage means formed in said housing for connecting said course with said cavity, and a plurality of ports formed in the rotor for sequentially establishing communication between said passage means and said working chambers whereby said rotor is drivingly rotated about said cavity.

7. A vibration generator comprising a housing having a cavity with an inner surface formed therein, a rotor having an outer surface, said rotor supported in said cavity for rotation therein with the axis of the rotor offset and parallel to the axis of the cavity, said inner surface being shaped as a bi-lobed epitrochoid, a plurality of apex portions formed on the periphery of the rotor and being equally spaced about the axis of the rotor so that straight lines interconnecting said apex portions form an equilateral triangle, each of said apex portions continuously located proximate said inner surface during the rotation of said rotor so as to form a plurality of variable volume working chambers, a source of pressurized fluid, passage means formed in said housing for connecting said source with said cavity, and a plurality of ports formed in the rotor for sequentially establishing communication between said passage means and said working chambers whereby said rotor is drivingly rotated about said cavity.

8. A vibration generator comprising a housing having a cavity with an inner surface formed therein, a rotor having an outer surface, means supporting said rotor in said cavity for rotation therein with the axis of the rotor offset and parallel to the axis of the cavity, said inner surface being shaped as a bi-lobed epitrochoid, a plurality of apex portions formed on the periphery of the rotor and being equally spaced about the axis of the rotor, each of said apex portions continuously located proximate said inner surface during the rotation of said rotor so as to form a plurality of variable volume working chambers, a source of pressurized fluid, passage means formed in said housing for connecting said source with said cavity, and a plurality of ports formed in the rotor for sequentially establishing communication between said passage means and said working chambers whereby said rotor is drivingly rotated about said cavity.

9. A vibration generator comprising a housing having a cavity with an inner surface formed therein, a shaft fixed to said housing and centrally disposed in said cavity, a rotor supported on said shaft for rotation thereabout with the axis of the rotor offset and parallel to the axis of the shaft, said inner surface being shaped as a bi-lobed epitrochoid, three apex portions formed on the periphery of the rotor and being equally spaced about the axis of the rotor, each of said apex portions continuously located proximate said inner surface during the rotation of said rotor so as to form a plurality of variable volume working chambers, a source of pressurized air, passage means formed in said housing on opposite sides of said shaft for connecting said source with said cavity, a plurality of ports formed in the rotor for sequentially establishing communication between said passage means and said working chambers whereby said rotor is drivingly rotated about said cavity, and passages formed in said housing for connecting each of the lobes of the cavity to atmosphere for exhausting said pressurized air therefrom during the rotation of said rotor.

10. The vibration generator of claim 9 wherein said shaft and said rotor are formed with mating gear teeth to provide non-slip orbital movement of said rotor about said shaft.

11. A vibration generator comprising a housing having a cavity with an inner surface formed therein, a shaft fixed to said housing and centrally disposed in said cavity, a rotor having an outer surface, said rotor engaging said shaft for rotation thereabout with the axis of the rotor offset and parallel to the axis of the shaft, said inner surface being shaped as a bi-lobed epitrochoid, said rotor having a generally triangular shape with apex portions formed on the periphery of the rotor, said apex portions being equally spaced about the axis of the rotor and continuously located proximate said inner wall during the rotation of said rotor so as to form a plurality of variable volume working chambers, a source of compressed air, a pair of air inlet passage means formed in said housing on opposite sides of said shaft for connecting said source with said cavity, the center of each of said air inlet passage means located substantially on a straight line passing through the center of said shaft and being equally spaced therefrom, an elongated port formed in said rotor adjacent each of said apex portions, an orifice located at the outer surface of said rotor and connected to said elongated port, said elongated port adapted to register with said air inlet passage means for establishing communication between said working chambers and said source for driving said rotor about said shaft, and an air exhaust port formed in said housing for connecting each of said lobes of the cavity to atmosphere.

12. A vibration generator comprising a housing having a cavity with an inner surface formed therein, a round shaft fixed to said housing and centrally disposed in said cavity, a rotor having an outer surface, a circular opening centrally formed in said rotor and engaging said shaft for rotation thereabout with the axis of the rotor offset and parallel to the diameter of said shaft and the diameter of said circular opening having a ratio of 2 to 3, said inner surface being shaped as a bi-lobed epitrochoid, said rotor having a generally triangular shape with apex portions formed on the periphery of the rotor, said apex portions being equally spaced about the axis of the rotor and continuously located proximate said inner wall during the rotation of said rotor so as to form a plurality of variable volume working chambers, a source of compressed air, a pair of air inlet passage means formed in said housing on opposite sides of said shaft for connecting said source with said cavity, the center of each of said air inlet passage means located on a straight line passing through the center of said shaft and being equally spaced therefrom, an elongated port formed in said rotor adjacent each of said apex portions, an orifice located in the outer surface of said rotor and connected to said elongated port, said elongated port adapted to register with said air inlet passage means for establishing communication between said working chambers and said source for driving said rotor about said shaft, and an air exhaust port formed in said housing for connecting each of said lobes of the cavity to atmosphere.

13. A vibration generator comprising a housing having a cavity with an inner surface formed therein, a shaft fixed to said housing and centrally disposed in said cavity, a rotor having an outer surface, said rotor engaging said shaft for rotation therabout with the axis of the rotor offset and parallel to the axis of the shaft, said inner surface being shaped as a bi-lobed epitrochoid whereby said cavity has a minor and major axis, said rotor having a generally triangular shape with apex portions formed on the periphery of the rotor, said apex portions being equally spaced about the axis of the rotor and continuously located proximate said inner wall during the rotation of said rotor so as to form a plurality of variable volume working chambers, a source of compressed air, a pair of air inlet passage means formed in said housing on opposite sides of said shaft for connecting said source with said cavity, the center of each of said air inlet passage means located substantially on said minor axis and being equally spaced from said shaft, an elongated port formed in said rotor adjacent each of said apex portions, an orifice located in the outer surface of said rotor and connected to said elongated port, said elongated port adapted to register with said air inlet passage means for establishing communication between said working chambers and said source for driving said rotor about said shaft, and air exhaust ports formed in said housing on opposite sides of said major axis for connecting each of said lobes of the cavity to atmosphere.

14. A vibration generator comprising a housing having a cavity with an inner surface formed therein, a shaft fixed to said housing and centrally disposed in said cavity, said shaft formed with external gear teeth, a rotor having an outer surface and having internal gear teeth mating with said external gear teeth, said rotor adapted to rotate about said shaft with the axis of the rotor offset and parallel to the axis of the shaft, said inner surface being shaped as a bi-lobed epitrochoid, said rotor having a generally triangular shape with apex portions formed on the periphery of the rotor, said apex portions being equally spaced about the axis of the rotor and continuously located proximate said inner wall during the rotation of said rotor as as to form a plurality of variable volume working chambers, a source of compressed air, a pair of air inlet passage means formed in said housing on opposite sides of said shaft for connecting said source with said cavity, the center of each of said air inlet passage means located on a straight line passing through the center of said shaft and being equally spaced therefrom, an elongated port formed in said rotor adjacent each of said apex portions, an orifice located in the outer surface of said rotor and connected to said elongated port, said elongated port adapted to register with said air inlet passage means for establishing communication between said working chambers and said source for driving said rotor about said shaft, and an air exhaust port formed in said housing for connecting each of said lobes of the cavity to atmosphere.

15. A vibration generator adapted to be driven by a source of pressurized fluid, comprising a housing having a cavity with an inner surface formed therein, a rotor having an outer surface, said rotor supported in said cavity for rotation therein with the axis of the rotor offset and parallel to the axis of the cavity, one of said surfaces being shaped as a trochoid with the other of said surfaces being generally of an enveloping shape, a plurality of apex portions formed on one of said surfaces, each of said apex portions continuously located proximate the other of said surfaces during the rotation of said rotor so as to form a plurality of variable volume working chambers, and means formed in said housing for establishing communication between said source of pressurized fluid and said working chambers whereby said rotor is drivingly rotated about said cavity.

16. A vibration generator comprising a housing having a cavity with an inner surface formed therein, a rotor having an outer surface supported in said cavity for rotation therein with the axis of the rotor offset and parallel to the axis of the cavity, one of said surfaces being shaped as a trochoid with the other of said surfaces being generally of an enveloping shape, a plurality of apex portions formed on one of said surfaces, each of said apex portions continuously located proximate the other of said surfaces during the rotation of said rotor so as to form a plurality of variable volume working chambers, a source of pressurized fluid, first passage means formed in said housing for connecting said source with said cavity, second passage means formed in said housing and connected with the atmosphere, and a plurality of ports formed in the rotor for sequentially establishing communication between said second passage means and said working chambers whereby said rotor is drivingly rotated about said cavity.

17. The vibration generator of claim 16 wherein the outer surface of said rotor is shaped as a bi-lobed epitrochoid and the inner surface of said cavity has the configuration of an enveloping curve with three lobe portions.

18. The vibration generator of claim 15 wherein said inner surface is shaped as a hypotrochoid, and said rotor comprises a pair of apex portions formed on the periphery of the rotor at diametrically opposed points.

19. The vibration generator of claim 17 wherein each of said lobe portions of said cavity is provided with an air inlet port and an exhaust port located along a line passing through the center of said cavity, and said exhaust ports being angularly spaced from each other by 120° about said center.

20. The vibration generator of claim 17 wherein said ports are located in said rotor on opposite sides of the rotor axis and along the major axis thereof.

References Cited by the Examiner
UNITED STATES PATENTS 3,135,124   6/1964   Sartor et al. _____ 74—87

FRED C. MATTERN, JR., *Primary Examiner.*

F. E. BAKER, *Assistant Examiner.*